J. W. ACKER.
Horse Rake.
No. 82,474.  Patented Sept. 29, 1868.
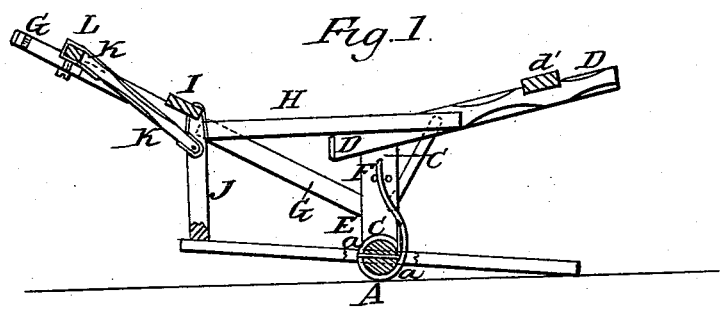
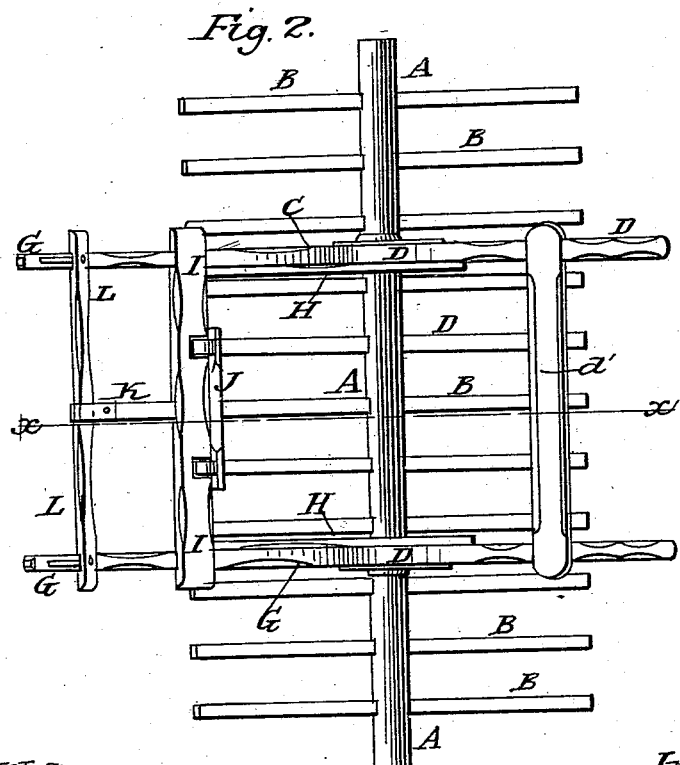

UNITED STATES PATENT OFFICE.

JOHN W. ACKER, OF COPENHAGEN, NEW YORK.

IMPROVEMENT IN HORSE-RAKES.

Specification forming part of Letters Patent No. 82,474, dated September 29, 1868.

*To all whom it may concern:*

Be it known that I, JOHN W. ACKER, of Copenhagen, in the county of Lewis and State of New York, have invented a new and useful Improvement in Revolving Horse Hay-Rake; and I do hereby declare that the following is a full, clear, and exact description thereof, which will enable others skilled in the art to make and use the same, reference being had to the accompanying drawings, forming part of this specification, in which—

Figure 1 is a vertical section of my improved rake, taken through the line $x\,x$, Fig. 2. Fig. 2 is a top or plan view of the same.

Similar letters of reference indicate corresponding parts.

My invention has for its object to improve the construction of the ordinary revolving hay-rake, so as to make it more convenient and effective in operation; and it consists in the construction and combination of the various parts, as hereinafter more fully described.

A is the head or shaft, to which the teeth B are attached. The head or shaft A is made in two parts, or divided longitudinally through its center in a line with the length of the teeth B. The parts or halves of the shaft A are held together, clamping the teeth B between them, by bolts, as shown in Fig. 2. C are the standards, to the upper ends of which the draft-bars D are attached. The lower ends of the standards C are concaved or hollowed out, and rest and fit upon the journals formed upon the shaft or head A, to which they are secured by the straps E, which pass around the said journals, and the ends of which are secured to the said standards. The forward ends of the shaft-bars D are held in their proper relative positions by the brace-bar $d'$. Upon the shaft or head A, at the side of the standards C, are formed cams $a'$, upon which the lower ends of the springs F rest. The springs F are attached to the side of the standards C, in such positions that their lower ends may rest upon the cams $a'$ as the rake revolves, and as the rake-teeth come into the proper working position the ends of the said springs strike against the shoulders of the said cams or circular inclines $a'$, and hold the rake-head securely in position while being loaded. G are the side bars of the handle-frame, the forward ends of which are attached to the lower parts of the standards C, and which are strengthened by the brace-bars H, as shown in Fig. 1. The rear parts of the bars G are held in their proper relative positions by the cross-bar I, the ends of which are securely attached to said side bars. To the cross-bar I is pivoted the foot-frame J, the lower cross-bar of which rests upon the rear teeth to steady the rake while working, and which said frame must be withdrawn from said teeth before the rake-head can revolve. K is a connecting-bar, one end of which is pivoted to the foot-frame J, and the other end of which is attached to the handle L. The ends of the handle L rest upon the rear ends of the bars G, to which said ends are secured by bolts attached to the ends of the handles L, and which pass through slots in the ends of the bars G, as shown in Figs. 1 and 2.

This construction enables the handle L to be drawn back to remove the foot-frame J from the teeth B, and to be pushed forward to again take hold of said teeth when the rake-load has been discharged.

Having thus described my invention, what I claim as new, and desire to secure by Letters Patent, is—

The foot-frame J, when its operating-handle L is adapted to slide in slots formed in the ends of the bars G, as herein described, for the purpose specified.

JOHN W. ACKER.

Witnesses:
 A. H. KELLOGG,
 DAVID STILLMAN.